United States Patent
Takechi

(10) Patent No.: US 7,100,469 B2
(45) Date of Patent: Sep. 5, 2006

(54) HYPOID REDUCING DEVICE

(75) Inventor: Tetsuo Takechi, Handa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 278 days.

(21) Appl. No.: 10/265,160

(22) Filed: Oct. 7, 2002

(65) Prior Publication Data
US 2003/0131677 A1 Jul. 17, 2003

(51) Int. Cl.
*F16H 1/14* (2006.01)

(52) U.S. Cl. .......................... 74/420; 74/606 R
(58) Field of Classification Search ........... 74/606 R, 74/420, 416, 417
See application file for complete search history.

(56) References Cited

U.S. PATENT DOCUMENTS

| | | | | |
|---|---|---|---|---|
| 4,484,484 A | * | 11/1984 | Wissink et al. ............... 74/41 |
| 5,165,495 A | | 11/1992 | Fujii |
| 5,375,479 A | * | 12/1994 | Kouno et al. ............... 74/420 |
| 5,609,072 A | * | 3/1997 | Lequis et al. ............ 74/606 R |
| 5,634,374 A | * | 6/1997 | Depietri ..................... 74/420 |
| 5,953,964 A | * | 9/1999 | Cognigni et al. ......... 74/606 R |
| 6,036,174 A | * | 3/2000 | Andersen .................... 254/343 |
| 6,234,037 B1 | * | 5/2001 | Zimmer ..................... 74/421 A |

FOREIGN PATENT DOCUMENTS

| | | | |
|---|---|---|---|
| JP | 2000-228847 | * | 2/1999 |
| JP | 2000-228847 | | 8/2000 |
| JP | 2001-165246 | | 6/2001 |

* cited by examiner

*Primary Examiner*—David M. Fenstermacher
(74) *Attorney, Agent, or Firm*—Squire, Sanders & Dempsey, L.L.P.

(57) ABSTRACT

A hypoid reducing device that allows the coupling/connection between a hypoid gear set and a motor to be more flexible and have a wider applicability. A hypoid pinion shaft is supported by two bearings in a bearing case portion in a gear case. A hypoid pinion engages with a hypoid gear having an orthogonal axial line. The hypoid pinion shaft is provided with a base end portion that is a solid shaft portion projecting toward a motor beyond the bearing on the motor side. The motor and the bearing case portion of the hypoid gear set are coupled with a separately provided joint case, while the motor output shaft and the base end portion of the hypoid pinion shaft are coupled through coupling members in the joint case.

25 Claims, 3 Drawing Sheets

HYPOID REDUCING DEVICE

BACKGROUND OF THE INVENTION

1. Field of the Invention

The present invention relates to a hypoid reducing device having an improved coupling arrangement for a hypoid gear set and a motor. The hypoid gear set has a hypoid pinion shaft having a hypoid pinion at a tip end as an input shaft. The motor provides the hypoid pinion shaft with rotation driving force.

2. Description of the Related Art

Generally, in the manufacture of a geared motor, a series of reducers and a series of motors are separately manufactured, so that appropriate combinations can be selected. Therefore, a variety of general-purpose motors can be selected and combined with a specific reducer.

In the manufacture of a hypoid geared motor having a hypoid gear set with hypoid gears, a hypoid pinion must be formed at a tip end of the input shaft of the reducer, and the hypoid pinion must be provided in a gear case in the manner of a cantilever. Therefore, the hypoid pinion is often directly cut into the output shaft of the motor. In other words, the motor shaft could be exclusive, and the number of combinations available for the motors and reducers is limited. Therefore, a variety of general-purpose motors cannot be used.

Conventional hypoid geared motors have allowed the reducer and the motor to be independent and separate, so that combinations for reducers and motors can be more flexible.

FIG. 3 is a sectional view showing an arrangement of a hypoid gear set 100 and a motor 200 developed to form such a geared motor, and such an arrangement is, for example, disclosed by Japanese Patent Laid-Open Publication No. 2000-228847.

In the hypoid gear set 100 in FIG. 3, there are a hypoid pinion shaft 111, intermediate shafts 112A and 112B, and an output shaft 113. A hypoid pinion 114 is formed at the tip end of the hypoid pinion shaft 111, and a hypoid gear 115 to engage with the hypoid pinion 114 is provided at the intermediate shaft 112A.

When the hypoid pinion 114 engages the hypoid gear 115, the rotation direction of the motor shaft is changed at right angles.

A gear case 119 includes a main body case portion 119A, a coupling case portion 119B, and a pre-stage case portion 119C. The hypoid pinion shaft 111 is rotatably supported by two bearings 118A and 118B separated from each other in the axial direction over the coupling case portion 119B and the pre-stage case portion 119C.

The base end side of the hypoid pinion shaft 111 is hollow, and the motor shaft 201 of a motor 200 is inserted into the hollow space on the base end side. Bolts 204, 205, and 206 are used to couple the flange portion 202 of the motor 200 and the pre-stage case portion 119C, the pre-stage case portion 119C and the coupling case portion 119B, and the coupling case portion 119B and the main body case portion 119A, respectively.

The hollow hypoid pinion shaft 111 having the hypoid pinion 114 at its tip end is rotatably provided independently of the main body case portion 119A of the gear case 119 and the flange portion 202 of the motor 200, so that the hypoid gear set (100) as shown can be combined with various kinds of motors (200).

When the geared motor as described above is used, however, the hypoid pinion at the tip of the input shaft must frequently be changed. For example in the United States of America, there are set standards for motors and flanges. In general the motors and flanges according to these standards are not produced in Japan. Therefore, it is often the case that the geared motors as shown must locally be procured when they are used in the United States. In this case, the tip end of the hypoid pinion shaft must be adapted to such a locally procured motor.

The hypoid pinion must be worked using a special kind of working machine that is not normally available to any factories, and therefore cannot easily be worked to cope with different standards for the motor or flange. This increases both the working cost and manufacturing time.

BRIEF SUMMARY OF THE INVENTION

The present invention is directed to a solution to the problems associated with the conventional geared motor. It is an object of the present invention to provide a hypoid reducing device that allows the coupling flexibility between the hypoid gear set and the motor to be increased. Accordingly a variety of locally available motors can be readily coupled to the hypoid gear set.

According to the invention, the above-described problem is solved by providing a hypoid reducing device that includes a hypoid gear set supporting a hypoid pinion shaft having a hypoid pinion at a tip end by first and second bearings. The hypoid pinion shaft causes the hypoid pinion to engage a hypoid gear having an axial line orthogonal to a plane including the hypoid pinion shaft, thereby transmitting rotation. The hypoid reducing device also includes a motor coupled to the hypoid pinion shaft on a base end side for driving the hypoid pinion shaft to rotate. The hypoid pinion shaft includes a solid shaft portion projected toward the motor beyond the first bearing on the motor side of the joint case. The motor and a supporting case on the hypoid gear set side are coupled through a joint case provided separately from the supporting case on the side of the hypoid gear set. The motor shaft and the solid shaft portion of the hypoid pinion shaft are coupled through a coupling in the joint case.

According to the invention, a joint case couples the motor shaft and the hypoid pinion shaft of the hypoid gear set. The joint case is provided separately from the supporting case on the gear set side supporting the hypoid pinion shaft. The hypoid pinion shaft and the motor shaft are coupled through a coupling in the joint case.

Therefore, a variety of motor shafts or motor flanges, can be coupled to the hypoid gear set by simply changing the coupling or by changing the joint case, which can be readily produced. The hypoid pinion shaft having a non-standard hypoid pinion does not have to be exchanged, so that the hypoid gear set and the motor can be readily coupled regardless of the kind of the motor and flange or the applied standards.

A series of hypoid gear sets and a series of motors can be prepared so that any combination can be selected. In this case, a selected motor can be readily coupled to a hypoid gear set using a joint case and a coupling that can be easily worked or obtained, which reduces the manufacturing period and cost.

According to the invention, a portion of the hypoid pinion shaft between the two bearings may have a larger diameter than a portion positioned on the motor side in order to form a stepped portion. The hypoid pinion shaft can abut against the first bearing on the motor side between the two bearings so that the stepped portion allows an axial position of the hypoid pinion shaft relative to the hypoid gear to be determined. In this way, the stepped portion can abut against the first bearing on the motor side at the time of assembly, so that the axial position of the hypoid pinion shaft relative to the gears of the hypoid gear set, i.e., so-called pinion machine distance (PMD) is determined. Therefore, the engagement between the hypoid gear and the hypoid pinion that would otherwise be difficult can be readily achieved.

According to the invention, a supported portion of the hypoid pinion supported by the first bearing on the motor side may have a diameter larger than a diameter of the solid shaft portion, and a stepped portion may be formed between the supported portion and the solid shaft portion.

In this way, the stepped portion can be used to define the position of the coupling to be attached to the solid shaft portion in the joint case.

The joint case has a flange on the motor side coupled to a flange on the motor side, and/or a flange on the gear set side coupled to the case on the gear set side. The motor side flange and/or the gear set side flange of the joint case may be provided with coupling holes that can be coupled to at least two kinds of motors and/or gear set side cases. Thus, the joint case can have a wider applicability, and the invention can be more readily carried out.

DETAILED DESCRIPTION OF THE PREFERRED EMBODIMENTS

Figure 1:
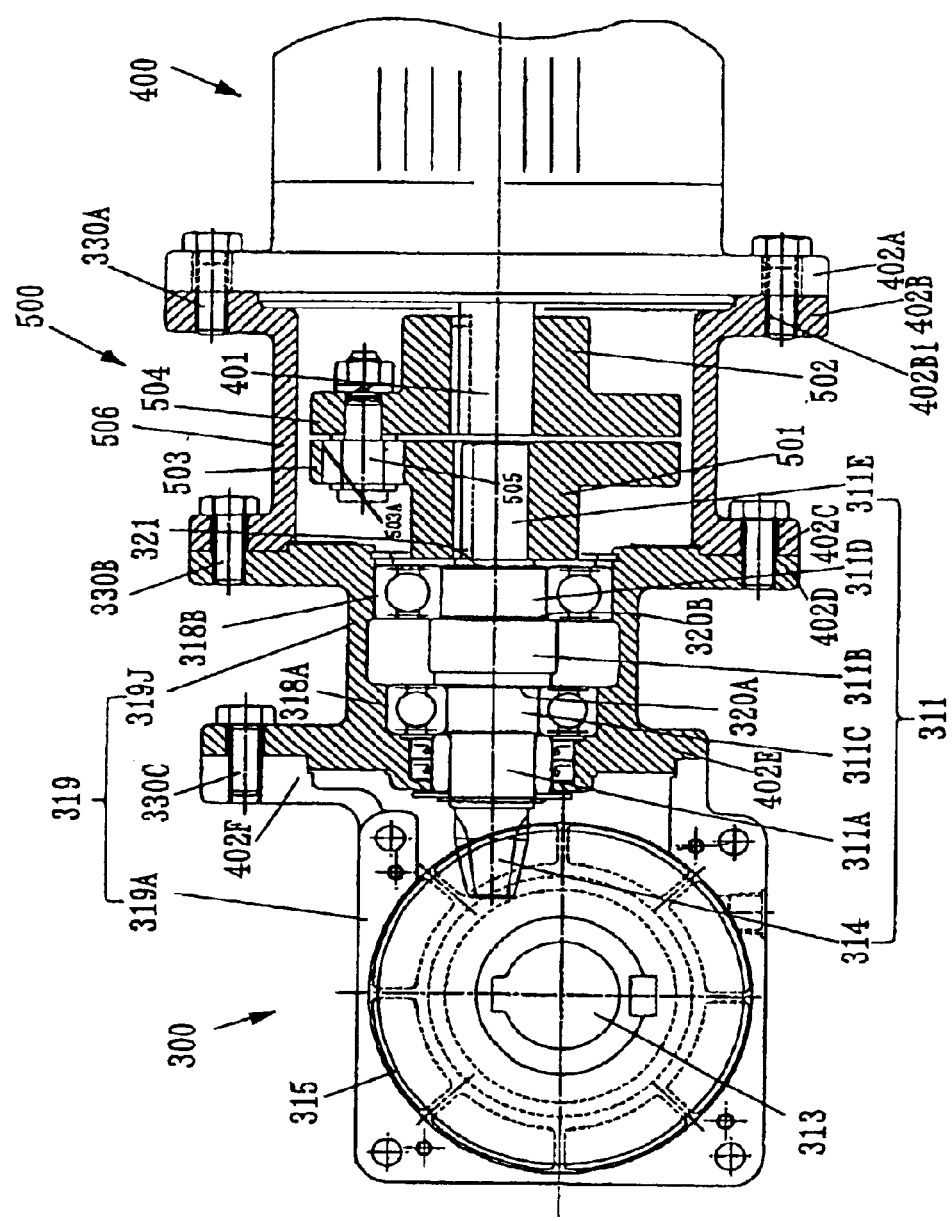
FIG. 1 is a sectional view of a hypoid geared motor according to an embodiment of the invention.

An embodiment of the present invention will now be described in detail in conjunction with the accompanying drawings.

In the following description, elements that are the same or substantially the same as those of the conventional example in FIG. 3 will be denoted by the reference numerals for the conventional example plus 200. In other words the lower order two digits of the numerals are the same. The same elements will not be described.

Figure 3:
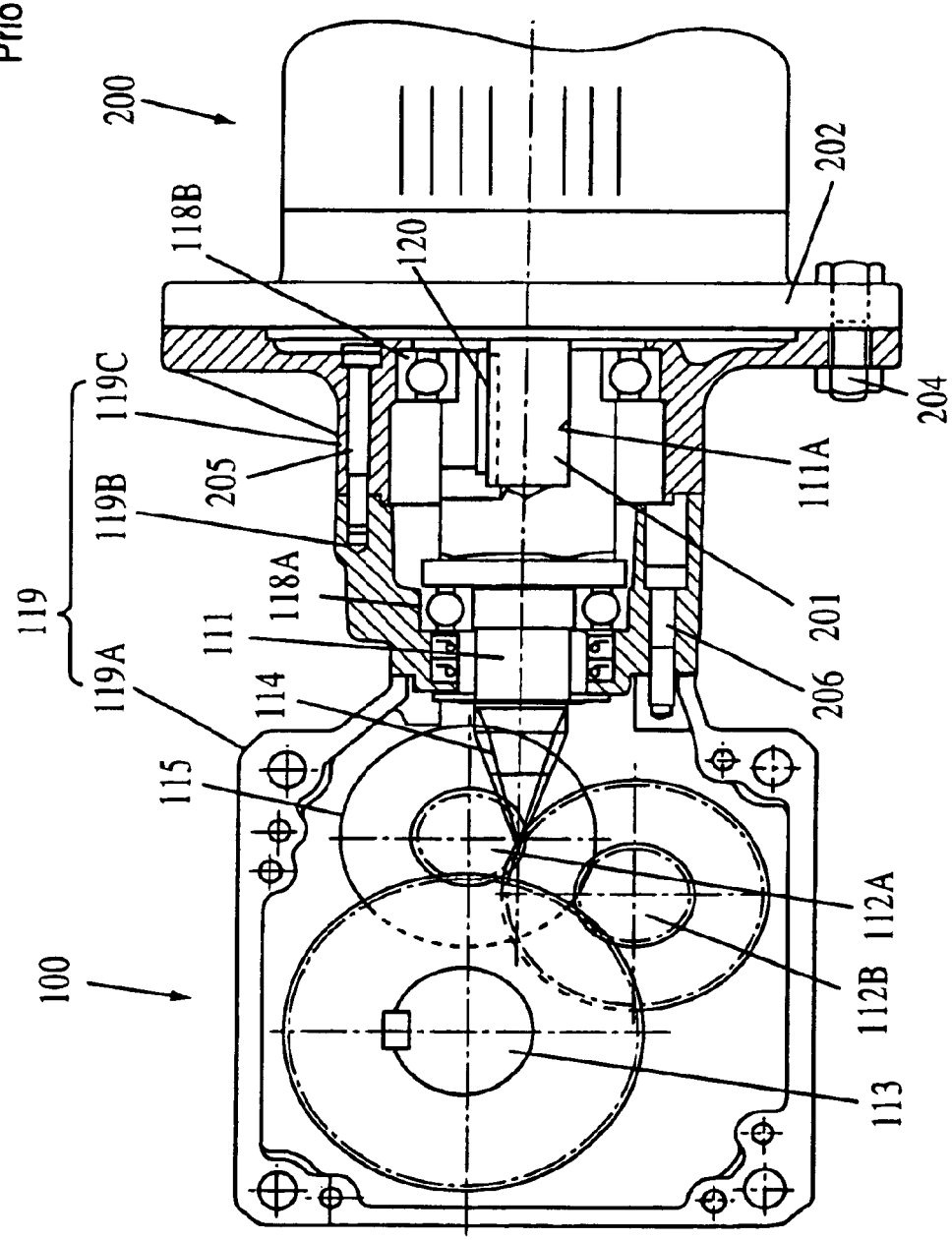
FIG. 3 is a sectional view of an example of a conventional hypoid geared motor.

The hypoid reducing device according to the embodiment is a single-stage gear type device, and different from the one shown in the conventional example (three-gear type) in FIG. 3. According to the invention, the arrangement of the hypoid gear set after the input stage is not particularly limited, and the invention is applicable to a variety of hypoid reducing devices.

FIG. 1 is a sectional view of a hypoid-type geared motor according to an embodiment of the invention.

The hypoid reducing device includes a hypoid reducer (hypoid gear set) 300, a motor 400, and a joint case 500.

The hypoid reducer 300 has a hypoid pinion shaft 311 and an output shaft 313, and the output shaft 313 is coupled to a hypoid gear 315. The gear case 319 (on the gear set side)of the hypoid reducer 300 includes a main body case portion 319A, and a bearing case portion (supporting case) 319J (that corresponds to a case portion produced by integrating the coupling case and the pre-stage case of the conventional example). Two bearings 318A and 318B (first bearing 318B and second bearing 319A) that support the hypoid pinion shaft 311 are assembled in the bearing case portion 319J. The bearing case portion 319J is coupled to the side of the motor 400 through the joint case 500 with no bearing.

Figure 2:
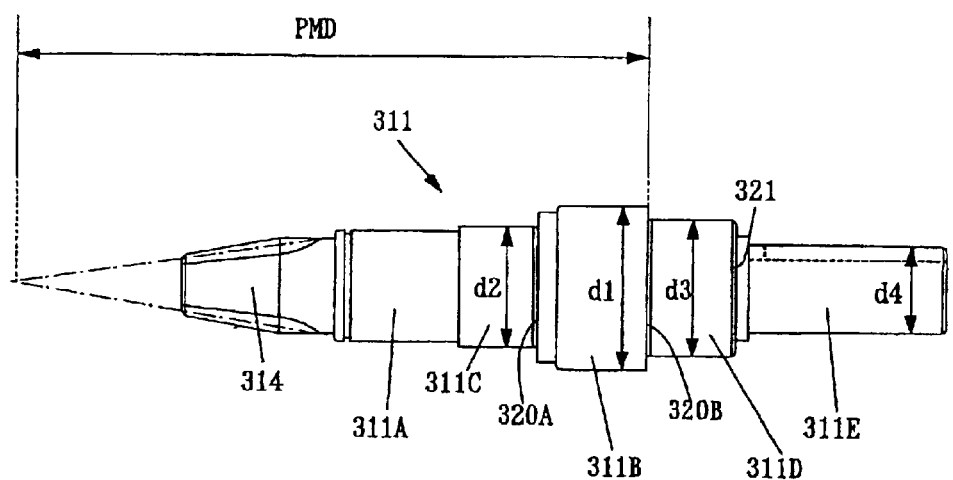
FIG. 2 is an enlarged sectional view of an input shaft.

As shown in FIG. 2, the hypoid pinion shaft 311 is entirely solid. The shaft includes a hypoid pinion 314 to engage with the hypoid gear 315 in the main body case portion 319A; a following tip end portion 311A; an intermediate portion 311B between the bearings 318A and 318B in the bearing case portion 319J; supported portions 311C and 311D rotatably supported by bearings 318A and 318B, respectively; and a base end portion 311E. The base end portion 311E is a solid shaft portion extending to the outside of the gear case 319, specifically, toward the motor 400 beyond the bearing 318B on the motor side.

As shown in FIG. 2, the diameter d1 of the intermediate portion 311B of the hypoid pinion shaft 311 is larger than the diameter d2 of the supported portion 311C on the tip end side and the diameter d3 of the supported portion 311D on the rear end side. Therefore, stepped portions 320A and 320B are formed between the intermediate portion 311B and the supported portions 311C and 311D, respectively. The stepped portions 320A and 320B are held between the bearings 318A and 318B in the bearing case 319J, so that the hypoid pinion shaft 311 can be securely positioned and supported in the axial direction.

Here, the stepped portion 320B abuts against the end face on the tip end side of the bearing 318B on the side of the motor 400. As such the stepped portion 320B allows the distance of the hypoid pinion 314 relative to the hypoid gear 315 of the hypoid reducer 300 (pinion machine distance: PMD) to be defined (see FIG. 2). In this way, the hypoid pinion 314 and the hypoid gear 315 that cannot be easily positioned relative to each other can be easily assembled.

The diameter d4 of the base end portion 311E of the hypoid pinion shaft 311 is smaller than the diameter d3 of the supported portion 311D. Therefore, there is a stepped portion 321 between the base end portion 311E and the supported portion 311D, so that coupling members in the joint case 500 can be positioned (described below).

The main body case 319A, the bearing case portion 319J, the joint case 500, and the motor 400 can be detachably coupled by coupling flanges 402A to 402F provided at their respective coupling positions using bolts 330A to 330C.

As shown, the joint case 500 is a hollow member having a flange 402B on the motor side and a flange 402C on the gear set side at its both ends. In the hollow space of the joint case 500, the base end portion 311E of the hypoid pinion shaft 311 and the motor shaft 401 of the motor 400 can be coupled using coupling members 501 and 502.

The coupling members 501 and 502 have flange portions 503 and 504 whose outermost peripheral parts have a diameter smaller than the inner circumference of the hollow space in the joint case 500. Their axial lengths are smaller than the axial length of the joint case 500, and both members are fully within the joint case 500.

In the example shown, the inner diameter of a bolt hole 503A on the side of the flange 503 is larger than the outer diameter of a bolt 505, so that the axis can shift to the coupling member 501 from the coupling member 502 on the other side (flexible arrangement). Thus, if there is a slight shift between the axial lines of the base end portion 311E and the motor shaft 401, the shift can be absorbed well by the flexible arrangement. Therefore, a hypoid reducing device with reduced vibration and noise can be achieved.

The arrangement of the coupling members are not limited to the flexible arrangement, and various other mechanical coupling means can be used. The coupling members 501 and 502, the base end portion 311E of the hypoid pinion shaft 311, and the motor shaft 401 can be coupled as their keys and key ways can be coupled, while other means may be employed.

Since the geared motor can have the structure as described above, the hypoid reducer 300 can be provided as an independent component that includes the hypoid pinion shaft 311, or the motor 400 can be completely independent. When the hypoid reducer 300 and the motor 400 are coupled, the coupling state between the coupling members 501 and 502, the hypoid pinion shaft 311, and the motor shaft 401 need only be adjusted in the joint case 500. Therefore, the hypoid pinion shaft 311 does not have to be changed (unless there is a torque-related problem), and a variety of hypoid reducers 300 and motors 400 can be readily coupled.

In this case, when the kind of the motor can be predicted, multiple kinds of the joint cases 500 and coupling members 501 and 502 may be prepared in advance. The joint cases and coupling members do not require a particularly high level production technique, so the manufacturing cost and manufacturing time can be reduced.

When, for example, a flange 402B on the motor side of a single joint case 500 is provided with coupling holes 402B1, and can be coupled by bolts 330A to at least two kinds of motors 400 whose specifications are previously known, the joint case 500 may have a wider applicability, and the present invention can be more readily carried out. This structure can be applied to the flange 402C on the side of the gear case and the flange 402D in the bearing case portion 319J.

It is understood that a joint case with no coupling holes may be used, and that coupling holes can be produced by working depending upon the situation.

According to the invention, various hypoid gear sets and various motors can be readily coupled without changing a hypoid pinion shaft that cannot be easily worked. Therefore, a series of hypoid gear sets and a series of motors can be separately prepared. Although the coupling between hypoid gears and motors selected from these different series is otherwise impossible or extremely difficult, the present invention provides that various independent motors including a general-purpose motor can be combined with an arbitrary hypoid gear set.

A plurality of joint cases or couplings may be prepared in advance or they may be produced (or procured) as required. In either case, the manufacturing time and cost can be reduced from conventional hypoid geared motors by producing a new adaptable hypoid pinion shaft.

What is claimed is:

1. A hypoid reducing device, said device comprising:
    a hypoid gear set including a hypoid pinion shaft having a hypoid pinion at a tip end thereof, a first bearing and a second bearing for supporting said hypoid pinion shaft, and a hypoid gear having an axial line orthogonal to a plane through said hypoid pinion shaft, said hypoid pinion being allowed to engage with said hypoid gear, thereby transmitting rotation;
    a joint case having a motor side and a hypoid gear set side;
    a motor having a motor shaft, coupled to said hypoid pinion shaft on a base end side thereof, for driving said hypoid pinion shaft to rotate, said hypoid pinion shaft including a solid shaft portion projected toward said motor beyond said first bearing on the motor side of the joint case;
    a supporting case for supporting said first and second bearings on said hypoid gear set side of said joint case, said joint case provided separately from said supporting case, and said motor and said supporting case being coupled through said joint case; and
    a coupling through which said motor shaft and said solid shaft portion are coupled in said joint case.

2. The hypoid reducing device according to claim 1, wherein a first portion of said hypoid pinion shaft between said first and second bearings has a larger diameter than a second portion positioned more on said motor side than said first portion in order to form a stepped portion, and wherein said hypoid pinion shaft is abutted against said first bearing on said motor side so that said stepped portion allows an axial position of said hypoid pinion shaft relative to said hypoid gear to be determined.

3. The hypoid reducing device according to claim 1, wherein a supported portion of said hypoid pinion shaft supported by said first bearing on said motor side has a diameter larger than a diameter of said solid shaft portion, and a stepped portion is formed between said supported portion and said solid shaft portion.

4. The hypoid reducing device according to claim 2, wherein a second portion of said hypoid pinion shaft supported by said first bearing on said motor side has a diameter larger than a diameter of said solid shaft portion, and a stepped portion is formed between said second portion and said solid shaft portion.

5. The hypoid reducing device according to claim 1, wherein said joint case has a motor side flange coupled to the motor; and the motor side flange is provided with first coupling means for coupling said motor side flange to at least two kinds of motors.

6. The hypoid reducing device according to claim 1, wherein said joint case has a hypoid gear set side flange coupled to said supporting case, and said hypoid gear set side flange is provided with coupling means for coupling said hypoid gear set side flange to at least two kinds of supporting cases.

7. The hypoid reducing device according to claim 5, wherein said joint case has a hypoid gear set side flange coupled to said supporting case, and said hypoid gear set side flange is provided with second coupling means for coupling said hypoid gear set side flange to at least two kinds of supporting cases.

8. The hypoid reducing device according to claim 5, wherein said first coupling means includes an aperture.

9. The hypoid reducing device according to claim 7, wherein said second coupling means includes an aperture.

10. The hypoid reducing device according to claim 6, wherein said coupling means includes an aperture.

11. A hypoid reducing device, said device comprising:
    a transmitting means including a hypoid pinion shaft having a hypoid pinion at a tip end thereof, a first bearing and a second bearing for supporting said hypoid pinion shaft, and a hypoid gear having an axial line orthogonal to a plane through said hypoid pinion shaft, said hypoid pinion being allowed to engage with said transmitting means, thereby transmitting rotation;
    a driving means, coupled to said hypoid pinion shaft on a base end side thereof, for driving said hypoid pinion shaft to rotate, said hypoid pinion shaft including a solid shaft portion projected toward said driving means beyond said first bearing, said first bearing positioned more toward said motor than said second bearing;
    a joining means for joining said driving means and said transmitting means, said joining means having a driving means side and a transmitting means side;

a supporting means for supporting said first and second bearings on said transmitting means side of said joining means, said joining means provided separately from said supporting means, and said driving means and said supporting means being coupled through said joining means; and a first coupling means for coupling said driving means and said solid shaft portion in said joining means.

12. The hypoid reducing device according to claim 11, wherein a first portion of said hypoid pinion shaft between said first and second bearing has a larger diameter than a second portion positioned more on said driving means side than said first portion in order to form a stepped portion, and wherein said hypoid pinion shaft is abutted against said first bearing on said driving means side so that said stepped portion allows an axial position of said hypoid pinion shaft relative to said hypoid gear to be determined.

13. The hypoid reducing device according to claim 11, wherein a supported portion of said hypoid pinion shaft supported by said first bearing on said driving means side has a diameter larger than a diameter of said solid shaft portion, and a stepped portion is formed between said supported portion and said solid shaft portion.

14. The hypoid reducing device according to claim 12, wherein a second portion of said hypoid pinion shaft supported by said first bearing on said driving means side has a diameter larger than a diameter of said solid shaft portion, and a stepped portion is formed between said second portion and said solid shaft portion.

15. The hypoid reducing device according to claim 11, wherein said joining means has a driving means side flange coupled to the driving means, and the driving means side flange is provided with second coupling means for coupling said driving means side flange to at least two kinds of driving means.

16. The hypoid reducing device according to claim 11, wherein said joining means has a transmitting means side flange coupled to said supporting means, and the transmitting means side flange is provided with second coupling means for coupling said transmitting means side flange to at least two kinds of supporting means.

17. The hypoid reducing device according to claim 15, wherein said joining means has a transmitting means side flange coupled to said supporting means, and the transmitting means side flange is provided with third coupling means for coupling said transmitting means side flange to at least two kinds of supporting means.

18. The hypoid reducing device according to claim 15, wherein said second coupling means includes an aperture.

19. The hypoid reducing device according to claim 16, wherein said second coupling means includes an aperture.

20. The hypoid reducing device according to claim 17, wherein said third coupling means includes an aperture.

21. A method of manufacturing a hypoid reducing device, said method comprising the steps of:
   a) mounting a hypoid gear and hypoid pinion shaft in a supporting case forming a hypoid gear set;
   b) engaging said hypoid gear with a hypoid pinion on a tip end of said hypoid pinion shaft in a plane orthogonal to an axis through said hypoid pinion shaft;
   c) supporting said hypoid pinion shaft through first and second bearings in said supporting case;
   d) connecting a joint case having a motor side and a hypoid gear set side to the supporting case;
   e) connecting a motor having a motor shaft to the joint case; and
   f) coupling the motor shaft to said hypoid pinion shaft through said joint case.

22. The method of claim 21, wherein the step of coupling the motor shaft to said hypoid pinion shaft further comprises the step of coupling a base end portion of said hypoid pinion shaft to the motor shaft with first and second coupling means.

23. The method of claim 22, wherein the steps of supporting said hypoid pinion shaft further comprises the steps of:
   abutting a first portion of said hypoid pinion shaft against the first bearing on the motor side of the joint case, said first portion of said hypoid pinion shaft being between said first and second bearing; and
   supporting a second portion of said hypoid pinion shaft, between said first portion and motor shaft, said second portion having a smaller diameter than said first portion forming a stepped portion between said first portion and second portions.

24. The method of claim 23, wherein the steps of supporting said hypoid pinion shaft further comprises the step of providing a solid shaft portion of said hypoid pinion shaft between said second portion of said hypoid pinion shaft and said motor shaft, said solid shaft portion having a smaller diameter than said second portion, forming a stepped portion therebetween.

25. The method of claim 21, wherein the step of connecting the motor to the joint case further comprises the step of mounting a flange portion of the motor to a flange portion of the joint case.

* * * * *

UNITED STATES PATENT AND TRADEMARK OFFICE
CERTIFICATE OF CORRECTION

PATENT NO.       : 7,100,469 B2                                              Page 1 of 1
APPLICATION NO. : 10/265160
DATED            : September 5, 2006
INVENTOR(S)      : Takechi It is certified that error appears in the above-identified patent and that said Letters Patent is hereby corrected as shown below:

On the Title Page of the Patent, item (30) Foreign Application Priority Data is missing.

Item (30):

The Foreign Application Priority Data should read as follows:

Oct. 5, 2001     (JP)………………………2001-309834

Signed and Sealed this

Twenty-eighth Day of November, 2006

JON W. DUDAS
*Director of the United States Patent and Trademark Office*